(12) United States Patent
Kang et al.

(10) Patent No.: US 6,871,411 B1
(45) Date of Patent: Mar. 29, 2005

(54) AUTOMATIC CALIBRATION METHOD FOR USE IN ELECTRONIC COMPASS

(75) Inventors: Jin Yong Kang, Kyungki-do (KR); Won Tae Choi, Kyungki-do (KR); Chang Hyun Kim, Kyungki-do (KR); Ha Woong Jeong, Inchun (KR); Han Chul Jo, Kyungki-do (KR); Oh Jo Kwon, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/757,497

(22) Filed: Jan. 15, 2004

(30) Foreign Application Priority Data

Dec. 3, 2003 (KR) .................................. 10-2003-0087100

(51) Int. Cl.[7] .............................................. G01C 17/38
(52) U.S. Cl. ........................................................ 33/356
(58) Field of Search ............................. 33/356, 355 R, 33/357, 361, 362

(56) References Cited

U.S. PATENT DOCUMENTS

| | | | | |
|---|---|---|---|---|
| 4,782,453 A | * | 11/1988 | Bauer et al. ................. | 33/356 |
| 5,345,382 A | * | 9/1994 | Kao ............................. | 33/356 |
| 5,440,484 A | * | 8/1995 | Kao ............................. | 33/356 |
| 6,606,799 B2 | * | 8/2003 | Kato ............................ | 33/356 |
| 6,768,957 B2 | * | 7/2004 | Kato ............................ | 33/356 |

* cited by examiner

*Primary Examiner*—Christopher W. Fulton
(74) *Attorney, Agent, or Firm*—Lowe Hauptman & Berner, LLP

(57) ABSTRACT

An automatic calibration method for use in an electronic compass. Using the automatic calibration method, the electronic compass automatically calculates and corrects offset and scale values of a geomagnetic signal by detecting one rotation of a geomagnetic axis during a predetermined period of time. The electronic compass calculates an azimuth angle upon receiving geomagnetic data from the geomagnetic sensor, and finds maximum and minimum values of sensor signals of individual axes of the geomagnetic sensor using the received geomagnetic data such that it can correct or calibrate deviation of the azimuth angle. When a time consumed for calibration is the same or shorter than a maximum calibration effective time, the electronic compass determines whether a current state of the detected entry signal indicates a predetermined steady-state flow. If the current state indicates the steady-state flow, at the same time a signal indicative of one rotation of the geomagnetic sensor is received, and the time consumed for calibration is longer than a predetermined minimum calibration effective time, the electronic compass calculates offset and scale values using the maximum and minimum values and stores the calculated offset and scale values.

7 Claims, 5 Drawing Sheets

AUTOMATIC CALIBRATION METHOD FOR USE IN ELECTRONIC COMPASS

BACKGROUND OF THE INVENTION

1. Field of the Invention

The present invention relates to an automatic calibration method for use in an electronic compass, and more particularly to an automatic calibration method for use in an electronic compass, which automatically calculates and corrects offset and scale values of a geomagnetic signal by detecting one rotation of a geomagnetic axis during a predetermined period of time using a timer, performs automatic calibration capable of calculating offset and scale values of a geomagnetic signal without receiving additional entry data from a user, and quickly copes with environmental variation.

2. Description of the Related Art

In recent times, there have been developed small-sized and low-priced geomagnetic sensor modules and electronic compasses. With the increasing development of the MEMS (Micro-Electro Mechanical Systems) technology, chip-sized geomagnetic sensor modules have been newly developed and used for a variety of applications. There is a need for the geomagnetic sensor to control offset and amplitude (scale) values of an x-axis to be equal to those of a y-axis in the case of using two-axis (x-axis and y-axis) signals. In the case of using three-axis signals, there is a need for the geomagnetic sensor to use calibration circuits or programs for x-axis, y-axis, and z-axis.

FIG. 1 is a block diagram illustrating a conventional electronic compass.

Referring to FIG. 1, the conventional electronic compass includes a geomagnetic sensor 11 for detecting a geomagnetic azimuth angle; an analog processor 12 for amplifying a detection signal of the geomagnetic sensor 11, and filtering the amplified detection signal to remove noise; an analog/digital (A/D) converter 13 for converting a geomagnetic signal received from the analog processor 12 into a digital signal using an A/D conversion process; and a digital processor 14 for calculating a geomagnetic azimuth angle on the basis of the digital signal received from the A/D converter 13, and performing a calibration process to calculate offset and scale values.

In this case, the offset value is an intermediate voltage of an AC (Alternating Current) waveform, and is denoted by the following Equation 1. The scale value is associated with the width between a maximum value and a minimum value of the AC waveform, and is denoted by the following Equation 2. Therefore, deviation of the azimuth angle can be corrected or calibrated using the above offset and scale values.

The geomagnetic sensor 11 is a prescribed sensor for detecting and measuring the earth's magnetic field intensity, and includes x-axis, y-axis, and z-axis sensors arranged at right angles to each other.

However, the conventional electronic compass has a disadvantage in that it must receive an entry signal from a user to carry out a desired calibration process, such that it cannot perform the calibration process without receiving the user's entry signal. In addition, the output signal of the geomagnetic sensor 11 abruptly varies with peripheral environments, such that offset and amplitude (scale) values of the output signal of the conventional electronic compass may also abruptly vary with the peripheral environments.

Therefore, provided that offset and amplitude values of the output signal of the electronic compass are unexpectedly changed in the case of carrying out the calibration process only using the user's entry signal, changed offset and amplitude values are real-time reflected in a resultant geomagnetic signal of the electronic compass, resulting in difficulty in calculating a correct azimuth angle.

A method for correcting or calibrating the offset and amplitude (scale) values created in the aforementioned conventional electronic compass will hereinafter be described with reference to FIG. 2.

FIG. 2 is a flow chart illustrating a calibration method for use in the conventional electronic compass.

Referring to FIG. 2, a controller serving as a calibration controller receives a calibration signal from an external switch or a host processor to carry out a calibration method of the conventional electronic compass at step S21. The controller operates a sensor at step S22, and receives data detected by the sensor at step S23. In this way, the conventional electronic compass can start the above calibration process after receiving a user's request signal. If the calibration process has started, the electronic compass drives the geomagnetic sensor to generate an analog signal therefrom.

The analog signal generated from the geomagnetic sensor is converted into a digital signal according to an A/D conversion process. The output signal of the geomagnetic sensor positioned horizontally to the horizon is represented by sine or cosine wave signals associated with the azimuth angle, as shown in FIG. 3.

Thereafter, the controller calculates maximum and minimum values of the output signal of the geomagnetic sensor using the entry data at step 524, and determines whether 1-closed loop equal to one rotation is provided at step S525. If it is determined that the 1-closed loop equal to one rotation has been provided, the controller calculates offset and scale values of the geomagnetic signal of the geomagnetic sensor on the basis of the entry data at step S26, and stores the calculated offset and scale values at step S27. In other words, if the geomagnetic sensor is rotated at least one time, the controller finishes collecting data of the geomagnetic sensor to carry out the above calibration process.

If the geometric sensor is rotated more than one time, the controller stores calibration data in a nonvolatile memory such as an EEPROM or flash memory. Data stored in the memory includes minimum and maximum values of individual axes or scale and offset values calculated using the minimum and maximum values of the individual axes. The process for calculating the scale and offset values indicates a calibration process of the present invention. In this case, scale and offset values associated with individual axes are represented by the following Equations 1 and 2, respectively:

$$\text{Scale} = C/(\text{Max}-\text{Min}), \text{ where } C \text{ is an arbitrary constant} \quad [\text{Equation 1}]$$

$$\text{Offset} = \frac{(\text{Max} + \text{Min})}{2} \quad [\text{Equation 2}]$$

However, the above-identified conventional calibration method has a disadvantage in that it requires a user's data entry process to carry out a calibration process capable of calculating offset and scale values of individual axes of the geomagnetic sensor. Furthermore, provided that peripheral environmental conditions are unexpectedly changed during an operation time of the electronic compass, the aforementioned conventional calibration method cannot update calibration data according to the changed peripheral environmental conditions.

SUMMARY OF THE INVENTION

Therefore, the present invention has been made in view of the above problems, and it is an object of the present invention to provide a method for finding an inclination angle of an electronic compass, which automatically calculates and corrects offset and scale values of a geomagnetic signal by detecting one rotation of a geomagnetic axis during a predetermined period of time using a timer.

It is another object of the present invention to provide an automatic calibration method for use in an electronic compass, which performs an automatic calibration process capable of calculating offset and scale values of a geomagnetic signal without receiving additional entry data from a user, and quickly copes with environmental variation.

In accordance with the present invention, the above and other objects can be accomplished by the provision of an automatic calibration method for use in an electronic compass calculating an azimuth angle based on a geomagnetic sensor signal when minimum and maximum calibration effective times needed for a system are determined in advance, comprising the steps of: a) initializing and driving a geomagnetic sensor, receiving geomagnetic data from the geomagnetic sensor, and calculating an azimuth angle on the basis of the geomagnetic data; b) detecting a current state of an entry signal using the received geomagnetic data; c) finding maximum and minimum values of sensor signals of individual axes of the geomagnetic sensor using the received geomagnetic data; d) determining whether a time consumed for calibration is the same or shorter than a predetermined maximum calibration effective time; e) if it is determined that the time consumed for calibration is the same or shorter than the maximum calibration effective time, determining whether a current state of the detected entry signal corresponds to a predetermined steady-state flow; f) if it is determined that the current state of the detected entry signal corresponds to the steady-state flow, determining whether a signal indicative of one rotation of the geomagnetic sensor is received; g) if it is determined that the signal indicative of one rotation of the geomagnetic sensor is received, determining whether the current time is longer than a predetermined minimum calibration effective time; and h) if it is determined that the time consumed for calibration is longer than the minimum calibration effective time, calculating offset and scale values using the maximum and minimum values, and storing the calculated offset and scale values and azimuth data.

Preferably, the step (b) for detecting the current state of the entry signal may include the step of: b1) dividing one cycle of the geomagnetic sensor signal into a plurality of states S1~S4, and determining which one of the states corresponds to the current state of the entry signal on the basis of the received geomagnetic data.

Preferably, the step (d) for determining whether the maximum calibration effective time elapses may include the step of: d1) if it is determined that the time consumed for calibration is longer than the maximum calibration effective time, returning to an initial step.

Preferably, the steady-state flow of the step (e) may be comprised of a predetermined plurality of steady-state flows SF1~SF4 or SF5~SF8 to determine whether a signal of the geomagnetic sensor indicates a steady-state signal entry order using the plurality of states S1~S4.

Preferably, the steady-state flow of the step (e) may be set to either a plurality of clockwise steady-state flows SF1~SF4 or a plurality of counterclockwise steady-state flows SF5~SF8 using the plurality of states S1~S4.

Preferably, the step (f) for determining whether the signal indicative of one rotation of the geomagnetic sensor is received may include the step of: f1) if it is determined that the signal indicative of one rotation of the geomagnetic sensor is not received, determining that the geomagnetic sensor is not rotated one time, and returning to the step (a) for driving the geomagnetic sensor.

Preferably, the step (g) for determining whether the minimum calibration effective time is provided may include the step of: g1) if the time consumed for calibration is the same or shorter than the minimum calibration effective time, returning to an initial step.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
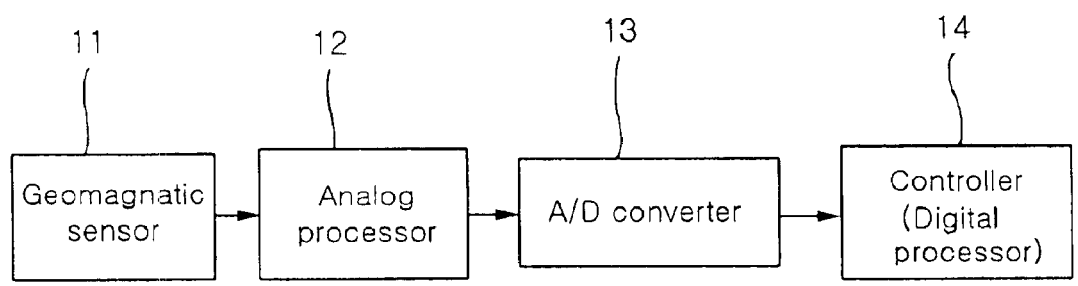
FIG. 1 is a block diagram illustrating a conventional electronic compass.
Figure 2:
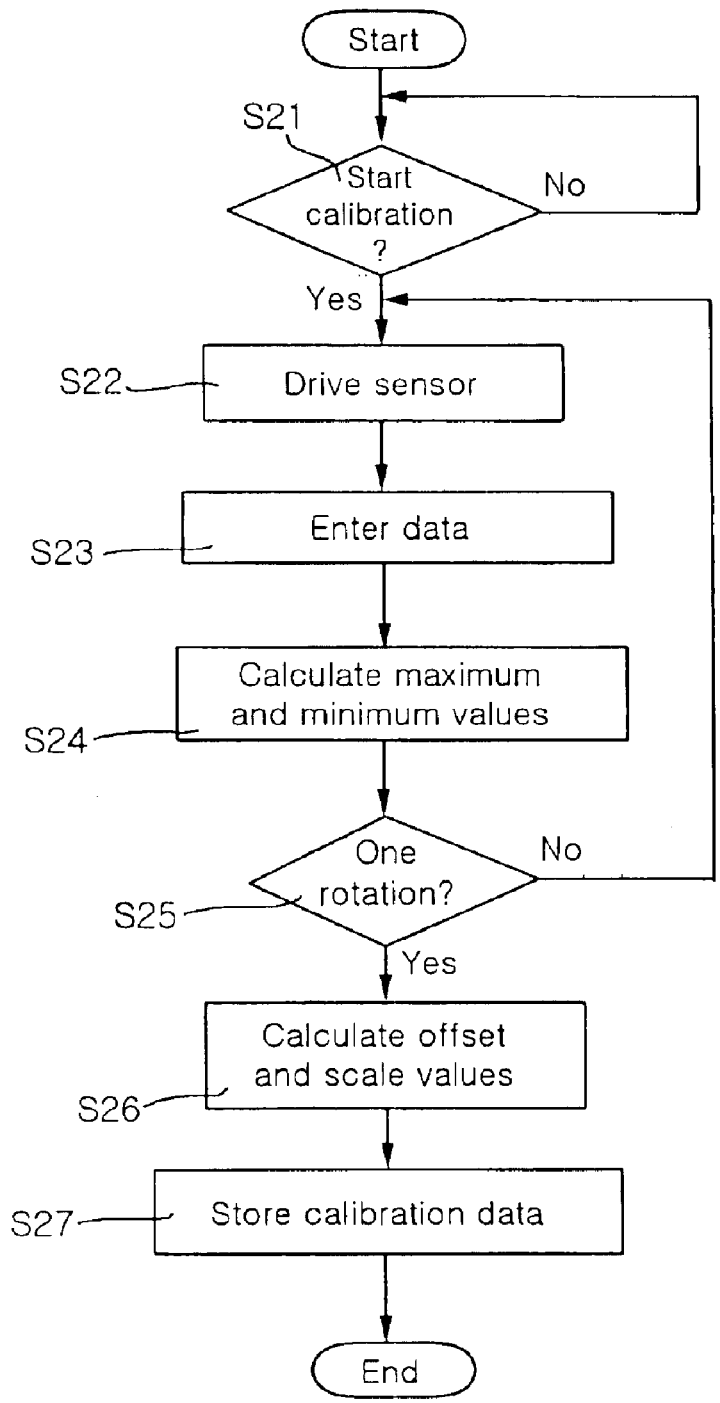
FIG. 2 is a flow chart illustrating a calibration method for use in the conventional electronic compass.
Figure 3:
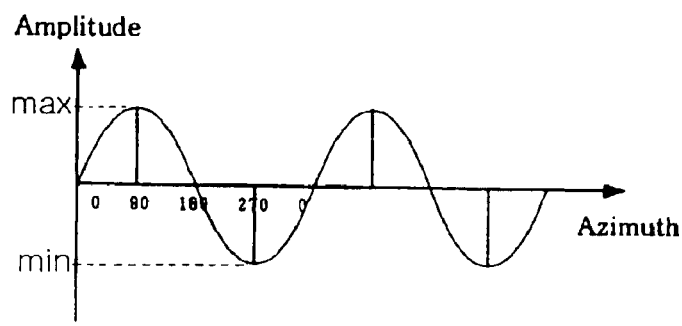
FIG. 3 is a waveform diagram illustrating signals detected from the geomagnetic sensor shown in FIG. 1.

Now, preferred embodiments in accordance with the present invention will be described in detail with reference to the accompanying drawings. In the drawings, the same or similar elements are denoted by the same reference numerals even though they are depicted in different drawings.

Figure 4:
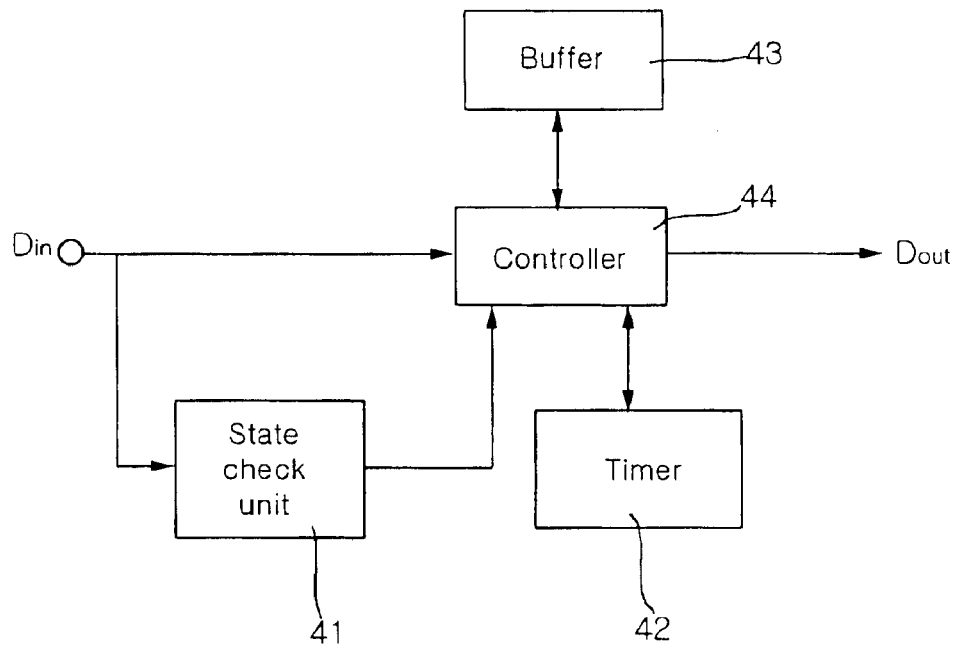
FIG. 4 is a block diagram illustrating a control module of an electronic compass in accordance with the present invention.

FIG. 4 is a block diagram illustrating a control module of an electronic compass in accordance with the present invention.

Referring to FIG. 4, the control module for use in the electronic compass pre-determines minimum and maximum calibration effective times T1 and T2 needed for a system containing the controller. The minimum calibration effective time T1 is a minimum time during which calibration data can be considered to be effective, and the maximum calibration effective time T2 is a maximum time during which calibration data can be considered to be effective. In order to carry out an effective calibration operation, a calibration duration time must be longer than the minimum calibration effective time T1 and be shorter than the maximum calibration effective time T2.

The control module automatically calibrates an azimuth angle for use in the electronic compass used for azimuth angle calculation on the basis of a geomagnetic signal received from the geomagnetic sensor, and its detailed description will hereinafter be described with reference to FIG. 4.

The control module includes a state check unit 41 for detecting a current state of an entry signal upon receiving data $D_{in}$ from the geomagnetic sensor, a calibration-time recording timer 42 for recording a time counted from a calibration start time, and a temporary storage buffer 43 for correcting calibration data composed of offset and scale values.

The control module further includes a controller 44. In more detail, the controller 44 calculates an azimuth angle upon receiving geomagnetic data from the geomagnetic sensor, and determines maximum and minimum values Max and Min of sensor signals of individual axes of the geomagnetic sensor using the received geomagnetic data in such a way that it can correct deviation of the azimuth angle. The controller 44 determines whether a current state of the detected entry signal indicates a predetermined steady-state flow on the condition that the time (t) consumed for the deviation correction is the same or shorter than the predetermined maximum calibration effective time T2. In this case, if the entry signal flow indicates the steady-state flow and the controller 44 receives a signal indicative of one rotation of the geomagnetic sensor, or if the current time (t) is longer than the predetermined minimum calibration effective time T1, the controller 44 calculates offset and scale values using the determined maximum and minimum values Max and Min, and stores the calculated offset and scale values.

The above-identified operations of the controller 44 are carried out using a prescribed software program. A calibration process according to the present invention indicates a process for calculating calibration data such as offset and scale data to correct deviation of the azimuth angle.

Operations and effects of the present invention will hereinafter be described with reference to the annexed drawings.

The automatic calibration method for use in an electronic compass according to the present invention automatically carries out an automatic calibration process by detecting one rotation of a geomagnetic axis during a predetermined period of time using a time, such that it can carry out such automatic calibration without receiving additional entry data from a user, and quickly cope with environmental variation. More detailed descriptions will hereinafter be described with reference to FIGS. 5 and 6.

Figure 5:
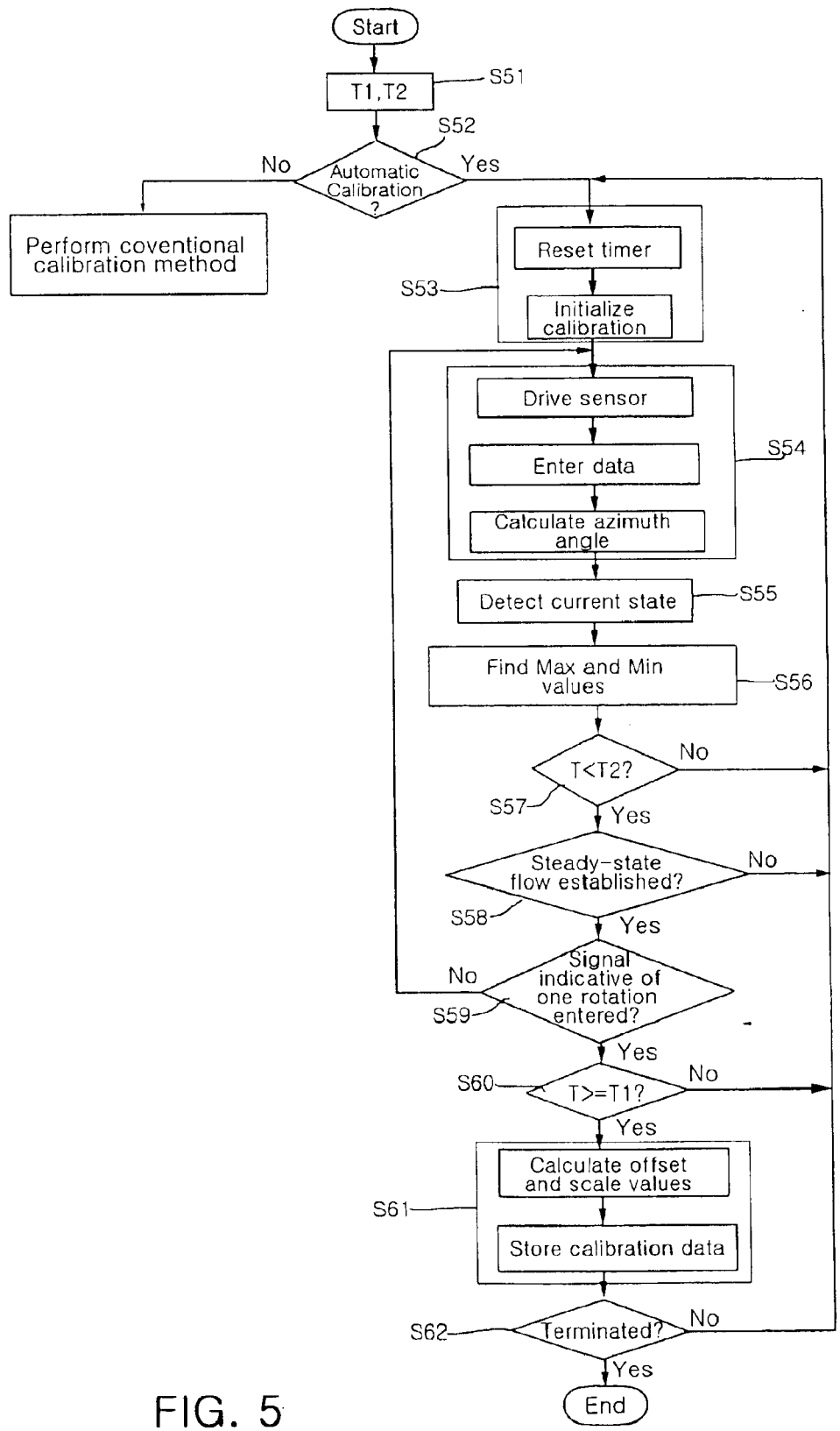
FIG. 5 is a flow chart illustrating an automatic calibration method for use in the electronic compass in accordance with the present invention.

FIG. 5 is a flow chart illustrating an automatic calibration method for use in the electronic compass in accordance with the present invention.

There is a need for an exemplary system such as an electronic compass of the present invention to set up maximum and minimum times needed for a calibration process. Therefore, the system determines the maximum time to be a maximum calibration effective time T1 in advance, and determines the minimum time to be a minimum calibration effective time T2 in advance.

The minimum calibration effective time T1 is a minimum time during which calibration data can be considered to be effective, and the maximum calibration effective time T2 is a maximum time during which calibration data can be considered to be effective. In order to carry out an effective calibration process, a calibration duration time must be longer than the minimum calibration effective time T1 and be shorter than the maximum calibration effective time T2.

Referring to FIG. 5, the controller 44 initializes the calibration-time recording timer 42 for counting a time consumed from a calibration start time point and the temporary storage buffer 43 for temporarily storing calibration data such as offset and scale values at step S53. In more detail, if an automatic calibration mode is selected, the controller 44 initializes the timer 42 for recording the time consumed until reaching a calibration completion time to zero "0", and initializes the buffer 43 for temporarily storing calibration data composed of offset and scale values. In this case, a first buffer, contained in the buffer 43, for storing the maximum values of individual axes of the geomagnetic sensor is initialized to a prescribed minimum value needed for calibration. A second buffer, also contained in the buffer 43, for storing the minimum values of individual axes is initialized to a prescribed maximum value needed for calibration.

Thereafter, if the controller 44 drives the geomagnetic sensor, it can detect a geomagnetic signal from the geomagnetic sensor. The detected geomagnetic signal is converted into a digital geomagnetic signal according to the A/D conversion process. The controller 44 calculates an azimuth angle upon receipt of the digital geomagnetic signal at step S54. In more detail, the controller 44 converts an analog signal generated from the geomagnetic sensor into digital data using the A/D conversion, and calculates the azimuth angle using the digital data at step S54.

Upon receiving a control signal from the controller 44, the state check unit 41 detects a current state of the entry signal using the received geomagnetic data at step S55. In more detail, the state check unit 41 divides one cycle of the geomagnetic signal generated from the geomagnetic sensor into a plurality of states S1~S4, and determines which one of the states S1~S4 corresponds to the current state of the entry signal on the basis of the received geomagnetic data at step S55.

Figure 6:
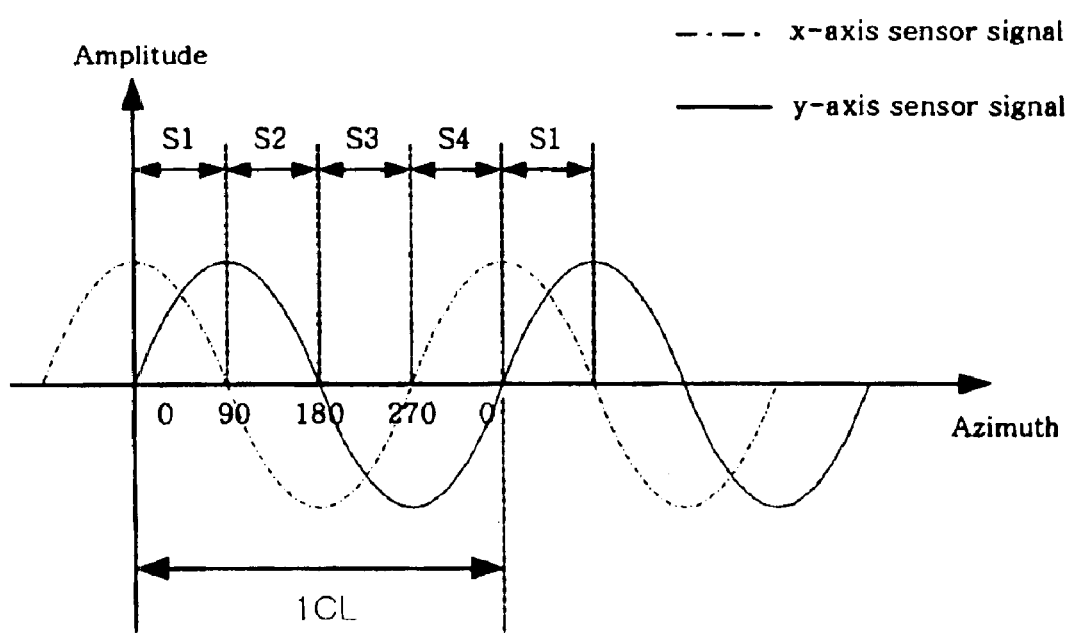
FIG. 6 is a waveform diagram illustrating individual states of detection signals of a geomagnetic sensor in accordance with the present invention.

For example, as shown in FIG. 6, if individual AC waveforms of x-axis and y-axis geomagnetic signals are positioned to be higher than a reference offset, the state check unit 41 assigns a positive(+) code to the AC waveforms. Otherwise, if individual AC waveforms of x-axis and y-axis geomagnetic signals are positioned to be lower than a reference offset, the state check unit 41 assigns a negative (−) code to the AC waveforms. Based on the above-identified determination references, a plurality of states of the waveforms shown in FIG. 6 are represented by the following Table 1.

The controller 44 firstly calculates an azimuth angle of a geomagnetic signal, carries out a calibration process for automatically calculating offset and scale values of the geomagnetic signal, and controls the state check unit 41 to determine a current state of entry data using geomagnetic data. This method for determining the current state of the entry data will hereinafter be described with reference to FIG. 6.

FIG. 6 is a waveform diagram illustrating individual states of detection signals of a geomagnetic sensor in accordance with the present invention.

Referring to FIG. 6, each state of a normal signal waveform generated from the geomagnetic sensor can be divided into four states S1~S4, and these four states S1~S4 can be represented by the following Table 1.

TABLE 1

|  | S1 | S2 | S3 | S4 |
| --- | --- | --- | --- | --- |
| X-axis code | + | − | − | + |
| Y-axis code | + | + | − | − |
| azimuth angle | 0~90 | 90~180 | 180~270 | 270~360 |

The controller 44 finds a maximum value Max and a minimum value Min of sensor signals of individual axes of the geomagnetic sensor upon receipt of the received geomagnetic data at step S56.

The controller 44 determines whether the time (t) consumed for calibration is the same or shorter than a predetermined maximum calibration effective time T2 at step S57. In more detail, the controller 44 finds the maximum and minimum values Max and Min, compares a current time of the timer 42 with the maximum calibration effective time T2, and determines whether the maximum calibration effective time T2 elapses until reaching a calibration completion time.

In this case, if it is determined that the current time is longer than the maximum calibration effective time T2 at step S57, this condition means that the current time is longer than an appropriate time needed for calibration, such that the controller 44 returns to the step S52 to repeat the azimuth angle calculation and automatic calibration process.

If it is determined that the current time is the same or shorter than the maximum calibration effective time T2 at step S56, the controller 44 determines whether the current state of the detected entry signal corresponds to a prescribed steady-state flow at step S58.

In more detail, the steady-state flow shown in the step S58 corresponds to one of the steady-state flows SF1~SF4 or SF5~SF8. The steady-state flows SF1~SF4 or SF5~SF8 are predetermined to determine whether the geomagnetic sensor signal indicates a steady-state signal entry order using a plurality of states S1~S4 having been generated by dividing one cycle of the geomagnetic sensor signal.

If the current time (t) of the timer 42 is shorter than the maximum calibration effective time T2, the controller 44 continues to check a state variation. In this case, an effective state where a calibration process is completed is established when the geomagnetic sensor is rotated in one direction, for example, clockwise or counterclockwise direction. Effective state variations are shown in the following Table 2.

TABLE 2

| | State Variation |
|---|---|
| SF1 | S1 → S2 → S3 → S4 → S1 |
| SF2 | S2 → S3 → S4 → S1 → S2 |
| SF3 | S3 → S4 → S1 → S2 → S3 |
| SF4 | S4 → S1 → S2 → S3 → S4 |
| SF5 | S1 → S4 → S3 → S2 → S1 |
| SF6 | S2 → S1 → S4 → S3 → S2 |
| SF7 | S3 → S2 → S1 → S4 → S3 |
| SF8 | S4 → S3 → S2 → S1 → S4 |

With reference to the above Table 2, if a state is changed according to undefined flows, such as either "S1→S2→S1" or "S1→S3→S2", other than eight steady-state flows, i.e., four clockwise steady-state flows SF1~SF4 and four counterclockwise steady-state flows SF5~SF8, the controller 44 determines that the entry signal does not correspond to a steady-state flow, such that the calibration process returns to the step S52.

Thereafter, if the steady-state flow is provided, the controller 44 determines whether a 1-closed loop signal indicative of one rotation of the geomagnetic sensor is received at step S59. In more detail, if it is determined that the state variation is effective, the controller 44 determines whether the geomagnetic sensor is rotated more than one time.

In this case, if the 1-closed loop signal indicative of one rotation of the geomagnetic sensor is not received at step S59, the controller 44 determines that the geomagnetic sensor is not rotated one time, and goes to step S54.

Otherwise, if it is determined that the geomagnetic sensor is rotated more than one time at step S59, this means a calibration completion condition such that the controller 44 goes to the next step S60.

If the signal indicative of one rotation of the geomagnetic sensor is received at step S59, the controller 44 determines whether a current time (t) is longer than a predetermined minimum calibration effective time T1 at step S60. If it is determined that the current time (t) is the same or shorter than the minimum calibration effective time T1 at step S60, the controller 44 returns to the step S53.

In more detail, if it is determined that the geomagnetic sensor is rotated at an excessively high speed, the controller 44 cannot find correct maximum and minimum values of the geomagnetic signal generated from the geomagnetic sensor. Therefore, if it is determined that the geomagnetic sensor is rotated more than one time, the controller 44 compares a current time of the timer 42 with the minimum calibration effective time T1, and determines whether the calibration process has been completed within an excessively short time. In this case, if it is determined that the calibration completion time is shorter than the minimum calibration effective time T1, the controller 44 repeats the aforementioned automatic calibration process from the first step of FIG. 5.

If it is determined that the current time of the timer 542 is longer than the minimum calibration effective time T1 at step S60, the controller calculates offset and scale values using the maximum and minimum values Max and Min, and stores the calculated offset and scale values and azimuth angle data in an internal memory at step S61.

In more detail, if it is determined that the current time (t) of the timer 42 is the same or longer than the minimum calibration effective time T1, the controller 44 determines that the calibration process has been completed within an appropriate time. Therefore, the controller 44 stores maximum and minimum values Max and Min of sensor signals of individual axes, or calculates offset and scale values of sensor signals of individual axes using the maximum and minimum values Max and Min and stores the calculated offset and scale values. Thereafter, if it is determined that the current time (t) of the timer 42 is shorter than the calibration completion time, the controller 44 returns to the first step of FIG. 5 to repeat all steps of the present invention.

In this way, the controller 44 can correct or calibrate deviation of the pre-calculated azimuth angle using the aforementioned calculated offset and scale values.

As described above, the present invention can select either a manual calibration method using a user's entry signal or an automatic calibration method for automatically finding calibration data in an azimuth angle measurement mode, such that it can carry out desired calibration using the selected calibration method.

If the electronic compass begins its operation and a user desires to carry out a manual calibration process, the controller 44 performs the manual calibration process in the same way as in the conventional art. Otherwise, if the user does not select the manual calibration process, the electronic compass receives geomagnetic data from the geomagnetic sensor, and performs an automatic calibration process during which an azimuth angle is calculated and at the same time offset and scale values of the geomagnetic data are automatically calculated. If a predetermined calibration completion condition is established, the electronic compass terminates the calibration process, and stores new calibration data in a nonvolatile memory such as an EEPROM or flash memory.

As apparent from the above description, the present invention provides an automatic calibration method for use in an electronic compass, which can automatically calculate offset and scale values of a geomagnetic signal by detecting one rotation of a geomagnetic axis during a predetermined period of time using a timer.

Furthermore, the automatic calibration method according to the present invention can perform automatic calibration capable of calculating offset and scale values of the geomagnetic signal without receiving additional entry data from a user, and can quickly cope with environmental variation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic calibration method for use in an electronic compass calculating an azimuth angle based on a geomagnetic sensor signal, comprising the steps of:

a) initializing and driving a geomagnetic sensor, receiving geomagnetic data from the geomagnetic sensor, and calculating an azimuth angle on the basis of the geomagnetic data;

b) detecting a current state of an entry signal using the received geomagnetic data;

c) finding maximum and minimum values of sensor signals of individual axes of the geomagnetic sensor using the received geomagnetic data;

d) determining whether a time consumed for calibration is the same or shorter than a predetermined maximum calibration effective time;

e) if it is determined that the time consumed for calibration is the same or shorter than the maximum calibration effective time, determining whether a current state of the detected entry signal corresponds to a predetermined steady-state flow;

f) if it is determined that the current state of the detected entry signal corresponds to the steady-state flow, determining whether a signal indicative of one rotation of the geomagnetic sensor is received;

g) if it is determined that the signal indicative of one rotation of the geomagnetic sensor is received, determining whether the current time is longer than a predetermined minimum calibration effective time; and h) if it is determined that the time consumed for calibration is longer than the minimum calibration effective time, calculating offset and scale values using the maximum and minimum values, and storing the calculated offset and scale values and azimuth data.

2. The method as set forth in claim 1, wherein the step (b) for detecting the current state of the entry signal includes the step of:

b1) dividing one cycle of the geomagnetic sensor signal into a plurality of states S1~S4, and determining which one of the states corresponds to the current state of the entry signal on the basis of the received geomagnetic data.

3. The method as set forth in claim 1, wherein the step (d) for determining whether the maximum calibration effective time elapses includes the step of:

d1) if it is determined that the time consumed for calibration is longer than the maximum calibration effective time, returning to an initial step.

4. The method as set forth in claim 1, wherein the steady-state flow of the step (e) is comprised of a predetermined plurality of steady-state flows SF1~SF4 or SFS~SF8 to determine whether a signal of the geomagnetic sensor indicates a steady-state signal entry order using the plurality of states S1~S4.

5. The method as set forth in claim 1, wherein the steady-state flow of the step (e) is set to either a plurality of clockwise steady-state flows SF1~SF4 or a plurality of counterclockwise steady-state flows SF5~SF8 using the plurality of states S1~S4.

6. The method as set forth in claim 1, wherein the step (f) for determining whether the signal indicative of one rotation of the geomagnetic sensor is received includes the step of:

f1) if it is determined that the signal indicative of one rotation of the geomagnetic sensor is not received, determining that the geomagnetic sensor is not rotated one time, and returning to the step (a) for driving the geomagnetic sensor.

7. The method as set forth in claim 1, wherein the step (g) for determining whether the minimum calibration effective time is provided includes the step of:

g1) if the time consumed for calibration is the same or shorter than the minimum calibration effective time, returning to an initial step.

* * * * *